(12) United States Patent
Mruk et al.

(10) Patent No.: US 8,299,165 B2
(45) Date of Patent: Oct. 30, 2012

(54) PNEUMATIC TIRE

(75) Inventors: Ralf Mruk, Lipperscheid (LU); Giorgio Agostini, Colmar-Berg (LU); Annette Lechtenboehmer, Ettelbruck (LU); Frank Schmitz, Bissen (LU); Claude Schweitzer, Colmar-Berg (LU); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/033,995

(22) Filed: Feb. 24, 2011

(65) Prior Publication Data

US 2012/0220706 A1 Aug. 30, 2012

(51) Int. Cl.
*C08L 77/00* (2006.01)
*C08K 3/04* (2006.01)

(52) U.S. Cl. ........................ 524/514; 524/495
(58) Field of Classification Search .......... 524/514
See application file for complete search history.

(56) References Cited

U.S. PATENT DOCUMENTS

| | | | | |
|---|---|---|---|---|
| 4,937,290 A | 6/1990 | Bauer et al. | | 525/184 |
| 4,996,263 A | 2/1991 | Pyke et al. | | 525/178 |
| 5,006,603 A * | 4/1991 | Takaki et al. | | 525/105 |
| 5,378,754 A | 1/1995 | Bauer et al. | | 524/514 |
| 5,910,544 A | 6/1999 | Ozawa et al. | | 525/178 |
| 6,209,603 B1 | 4/2001 | Kanenari et al. | | 152/458 |
| 6,401,780 B1 * | 6/2002 | Patitsas et al. | | 152/532 |
| 7,165,584 B2 | 1/2007 | Lin et al. | | 152/151 |
| 7,740,938 B2 | 6/2010 | Helft et al. | | 428/402 |
| 2005/0090616 A1 | 4/2005 | Dias et al. | | 525/191 |
| 2006/0269749 A1 * | 11/2006 | Okumura | | 428/402 |
| 2008/0115874 A1 * | 5/2008 | Thielen | | 152/541 |

FOREIGN PATENT DOCUMENTS

EP 2159260 3/2010
WO 2007/111584 A1 10/2007

OTHER PUBLICATIONS

Coffman et al., Journal of Polymer Science, 306, 1947.*
ACS Publications, Macromolecules, "Anionic Polymerization of e-Caprolactam in Miniemulsion: Synthesis and Characterization of Polyamide-6 Nanoparticles," Crespy et al., 2005, vol. 38, No. 16, pp. 6882-6887.
European Search Report completed May 14, 2012.

* cited by examiner

*Primary Examiner* — Hui Chin
(74) *Attorney, Agent, or Firm* — John D. DeLong

(57) ABSTRACT

The present invention is directed to pneumatic tire comprising at least one component, the at least one component comprising a rubber composition comprising:
at least one diene-based rubber; and
from 1 to 50 phr of a particulate polyamide having a particle size of from 0.1 to 1 micron, wherein the particulate polyamide is substantially spherical and wherein the particulate polyamide has a melting temperature greater than 210° C. as measured by ISO 11357.

17 Claims, No Drawings

PNEUMATIC TIRE

BACKGROUND OF THE INVENTION

The invention relates to tires that have improved rolling resistance while retaining good traction properties.

Conventionally tires are loaded with high surface area carbon black to provide good traction and good handling properties and a good cornering coefficient. A high level of fine carbon black, however, causes the tires to have a high hysteresis, which contributes to a high rolling resistance.

In the prior art, it is the general rule that improved traction can only be achieved by sacrificing rolling resistance, and rolling resistance can be improved only at the expense of traction.

In the conception of the present invention, it was proposed that if the level of carbon black was reduced, and the omitted carbon black was replaced with a filler material that reduced the hysteresis of the tread compound while maintaining stiffness, that rolling resistance could be improved, with only a slight or negligible change in traction.

It is an object of the present invention to provide a tire with improved rolling resistance, while traction is maintained.

Other objects of the invention will be apparent from the following description and claims.

SUMMARY OF THE INVENTION

The present invention is directed to a pneumatic tire comprising at least one component, the at least one component comprising:

at least one diene-based rubber; and from 1 to 50 phr of a particulate polyamide having a particle size of from 0.1 to 1 micron, wherein the particulate polyamide is substantially spherical.

DETAILED DISCLOSURE OF THE INVENTION

There is disclosed a pneumatic tire comprising at least one component, the at least one component comprising:

at least one diene-based rubber; and from 1 to 50 phr of a particulate polyamide having a particle size of from 0.1 to 1 micron, wherein the particulate polyamide is substantially spherical.

The present invention relates to a pneumatic tire. Pneumatic tire means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load. The present invention relates to both bias and radial-ply tires. Preferably, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

In the description of this invention, the terms "rubber" and "elastomer" when used herein are used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer."

The Tg of an elastomer, if referred to herein, refers to a "glass transition temperature" of the elastomer which can conveniently be determined by a differential scanning calorimeter at a heating rate of 10° C. per minute.

The rubber composition includes a particulate polyamide. In one embodiment, the rubber composition includes from 1 to 50 phr of a particulate polyamide. In one embodiment, the rubber composition includes from 10 to 30 phr of a particulate polyamide.

The particulate polyamide is in the form of fine particulates. Such particulates may be formed by any of the comminution methods as are known in the art, such as grinding and jet impingement. The comminution may be performed either at ambient or cryogenic temperatures. Suitable comminution techniques are those that will reduce the particle size of the particulate polyamide to a range suitable for use in the rubber composition. In one embodiment, the particle size of the particulate polyamide ranges from 0.1 to 1 microns. In one embodiment, the particle size of the particulate polyamide ranges from 0.2 to 0.50 microns.

The particulate polyamide generally has a relatively high melting temperature as determined by ISO 11357, to maintain the original particulate shape even after mixing at high temperature or exposure to high operating temperature. In one embodiment, the particulate polyamide has a melting temperature greater than 210° C. In one embodiment, the particulate polyamide has a melting temperature greater than 240° C. In one embodiment, the particulate polyamide has a melting temperature greater than 265° C. In one embodiment, the polyamide is polyamide 6. In one embodiment, the polyamide is polyamide 6,6. Polyamide of suitable melting temperature is available commercially for example in the Technyl® series from Rhodia.

In one embodiment, individual particles of the particulate polyamide are substantially spherical in shape.

By substantially spherical, it is meant that the polyamide particles have a surface area-based sphericity of greater than 0.9, ranging from 0.9 to 1, according to the following definition (following U.S. Pat. No. 5,915,150):

sphericity=[geometrical specific surface area ($m^2/g$) based on an assumption that the substantially spherical particles are in the form of true spheres]/[actually measured specific surface area ($m^2/g$) of the substantially spherical fine particles]. In one embodiment, the polyamide particles have a sphericity ranging from 0.9 to 1. In one embodiment, the polyamide particles have a sphericity ranging from 0.95 to 1.

The values of specific surface area ($m^2/g$) of the substantially spherical particles for calculation of sphericity referred to herein may be determined for example based on measurement of BET surface area by using a specific surface area meter (for example, "Autosorb 1," available from QUANTACHROME Co.) performed in the following manner.

About 0.3 g of substantially spherical particles are weighed into a cell, subjected to evacuation at a temperature of 40° C. and a vacuum of $1.0 \times 10^{-3}$ mm Hg for at least 1 hour, and then subjected to nitrogen adsorption, while being cooled at liquid nitrogen temperature, for specific surface area determination according to the BET multi-point method.

The geometrical specific surface area ($m^2/g$) on an assumption that the substantially spherical particles are in the form of true spheres, may be measured in the following manner. Sample substantially spherical particles are photographed at a magnification of 10,000 through an electron microscope, and images of 100 particles each having a particle size of at least 10 nm are selected at random to obtain an average of the longer-axis diameters of the 100 particles. Then, a substantially spherical fine particle is assumed to be a true sphere having a radius r (=½×the average longer-axis diameter) so that its surface area is calculated as $4\pi r^2$ (m$^2$) and its volume is calculated as $4/3\pi r^3$ (m$^3$). Then, by using a density $d_b$ (g/m$^3$) of the substantially spherical particles separately measured, the assumed geometrical specific surface area can be calculated as $4\pi r^2/(4/3\pi r^3\, d_b)=3/(r\, d_b)$.

Suitable particulate polyamide may be made for example following the methods of U.S. Pat. No. 7,740,938.

The particulate polyamide may be pretreated (treated before the particulate polyamide is mixed into the rubber composition) to enhance interaction with the rubber composition. In one embodiment, the treatment of the particulate polyamide comprises treating the particulate polyamide with an aqueous RFL emulsion comprising a resorcinol-formaldehyde resin, and one or more elastomer latexes.

In one embodiment, the RFL may include the resorcinol formaldehyde resin, a styrene-butadiene copolymer latex, a vinylpyridine-styrene-butadiene terpolymer latex, and a blocked isocyanate.

In a treatment step, the particulate polyamide is dipped in an RFL liquid. In one embodiment, the RFL adhesive composition is comprised of (1) resorcinol, (2) formaldehyde and (3) a styrene-butadiene rubber latex, (4) a vinylpyridine-styrene-butadiene terpolymer latex, and (5) a blocked isocyanate. The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are considerably superior to other condensation products in the adhesive mixture.

The resorcinol may be dissolved in water to which around 37 percent formaldehyde has been added together with a strong base such as sodium hydroxide. The strong base should generally constitute around 7.5 percent or less of the resorcinol, and the molar ratio of the formaldehyde to resorcinol should be in a range of from about 1.5 to about 2. The aqueous solution of the resole or condensation product or resin is mixed with the styrene-butadiene latex and vinylpyridine-styrene-butadiene terpolymer latex. The resole or other mentioned condensation product or materials that form said condensation product should constitute from 5 to 40 parts and preferably around 10 to 28 parts by solids of the latex mixture. The condensation product forming the resole or resole type resin forming materials should preferably be partially reacted or reacted so as to be only partially soluble in water. Sufficient water is then preferably added to give around 12 percent to 28 percent by weight overall solids in the final dip. The weight ratio of the polymeric solids from the latex to the resorcinol/formaldehyde resin should be in a range of about 2 to about 6.

The RFL adhesive may include a blocked isocyanate. In one embodiment from about 1 to about 8 parts by weight of solids of blocked isocyanate is added to the adhesive. The blocked isocyanate may be any suitable blocked isocyanate known to be used in RFL adhesive dips including, but not limited to, caprolactam blocked methylene-bis-(4-phenylisocyanate), such as Grilbond-IL6 available from EMS American Grilon, Inc., and phenol formaldehyde blocked isocyanates as disclosed in U.S. Pat. Nos. 3,226,276; 3,268,467; and 3,298,984; the three of which are fully incorporated herein by reference. As a blocked isocyanate, use may be made of reaction products between one or more isocyanates and one or more kinds of isocyanate blocking agents. The isocyanates include monoisocyanates such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocyante, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4diisocyanate, diphenylethane diisocyanate, 1,5-naphthalene diisocyanate, etc., and triisocyanates such as triphenylmethane triisocyanate, diphenylmethane triisocyanate, etc. The isocyanate-blocking agents include phenols such as phenol, cresol, and resorcinol, tertiary alcohols such as t-butanol and t-pentanol, aromatic amines such as diphenylamine, diphenylnaphthylamine and xylidine, ethyleneimines such as ethylene imine and propyleneimine, imides such as succinic acid imide, and phthalimide, lactams such as ε.-caprolactam, δ-valerolactam, and butyrolactam, ureas such as urea and diethylene urea, oximes such as acetoxime, cyclohexanoxime, benzophenon oxime, and α-pyrolidon.

The polymers may be added in the form of a latex or otherwise. In one embodiment, a vinylpyridine-styrene-butadiene terpolymer latex and styrene-butadiene rubber latex may be added to the RFL adhesive. The vinylpyridine-styrene-butadiene terpolymer may be present in the RFL adhesive such that the solids weight of the vinylpyridine-styrene-butadiene terpolymer is from about 50 percent to about 100 percent of the solids weight of the styrene-butadiene rubber; in other words, the weight ratio of vinylpyridine-styrene-butadiene terpolymer to styrene-butadiene rubber is from about 1 to about 2.

The rubber composition may contain the reaction product of a methylene acceptor and a methylene donor. In one embodiment, the rubber composition includes from 2.1 to 35 phr of the reaction product of a methylene acceptor and a methylene donor. In one embodiment, the rubber composition includes from 7 to 15 phr of the reaction product of a methylene acceptor and a methylene donor.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244, 725; U.S. Pat. No. 5,206,289; U.S. Pat. No. 5,194,513; U.S. Pat. No. 5,030,692; U.S. Pat. No. 4,889,481; U.S. Pat. No. 4,605,696; U.S. Pat. No. 4,436,853; and U.S. Pat. No. 4,092, 455. Examples of modified phenol novolak resins include but are not limited to cashew nut oil modified phenol novolak resin, tall oil modified phenol novolak resin and alkyl modified phenol novolak resin. In one embodiment, the methylene acceptor is a reactive phenol-formaldehyde resin. Suitable reactive phenol-formaldehyde resins include SMD 30207 from Schenectedy Chemicals.

Other examples of methylene acceptors include activated phenols by ring substitution and a cashew nut oil modified novolak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor ranges from 2 to 25 phr. In another embodiment, the amount of methylene acceptor ranges from 5 to 20 phr.

In-situ resins are formed in the rubber stock and involve the reaction of a methylene acceptor and a methylene donor. The term "methylene donor" is intended to mean a compound capable of reacting with the methylene acceptor and generate the resin in-situ. Examples of methylene donors which are suitable for use in the present invention include hexamethylenetetramine, hexamethoxymethylmelamine, hexaethoxymethylmelamine, imino-methoxymethylmelamine, imino-isobutoxymethylmelamine, lauryloxymethylpyridinium chloride, ethoxymethylpyridinium chloride trioxan and hexamethoxymethylmelamine. In addition, the methylene donors may be N-substituted oxymethylmelamines, of the general formula:

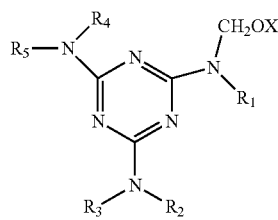

wherein X is hydrogen or an alkyl having from 1 to 8 carbon atoms, $R_1'$ $R_2$, $R_3$, $R_4$ and $R_5$ are individually selected from the group consisting of hydrogen, an alkyl having from 1 to 8 carbon atoms, the group —CH2OX or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylolmelamine. The N-methylol derivatives of melamine are prepared by known methods.

The amount of methylene donor that is present in the rubber stock may vary. Typically, the amount of methylene donor that is present will range from about 0.1 phr to 10 phr. Preferably, the amount of methylene donor ranges from about 0.2 phr to 4 phr.

The weight ratio of the methylene acceptor to methylene donor may vary. Generally speaking, the weight ratio ranges from about 0.5:1 to 25:1. Preferably, the range is from 2:1 to 20:1.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of isoprene or butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene copolymers, also known as ethylene/propylene/diene monomer (EPDM), and in particular, ethylene/propylene/dicyclopentadiene copolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a copolymer rubber, as E-SBAR, in amounts, for example, of about 2 to about 30 weight percent bound acrylonitrile in the copolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber compositions may include from about 10 to about 100 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber compositions may include from about 10 to about 100 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

The vulcanizable rubber compositions may include both silica and carbon black in a combined concentration of from about 20 to about 100 phr, in any weight ratio of silica to carbon black. In one embodiment, the vulcanizable rubber composition includes both silica and carbon black in approximately the same weight amounts, i.e., a weight ratio of about 1.

Other fillers may be used in the rubber compositions including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

In one embodiment the rubber composition may contain a conventional sulfur containing organosilicon compound. Examples of suitable sulfur containing organosilicon compounds are of the formula:

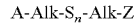

in which Z is selected from the group consisting of

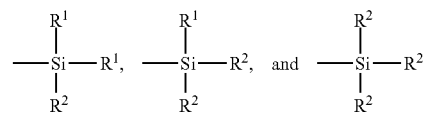

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula I, Z may be

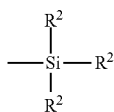

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this Example, a rubber composition for use in the tire of the present invention is illustrated.

Rubber compositions containing the materials set out in Table 1 was prepared using multiple stages of addition (mixing); at least one non-productive mix stage and a productive mix stage. The non-productive stages were discharged at a rubber temperature of 160° C. The drop temperature for the productive mix stage was 115° C.

The rubber compositions are identified as Sample 1 through Sample 9. The Samples were cured at about 165° C. for about 10 minutes. Table 2 illustrates the physical properties of the cured Samples 1 through 9. Samples were tested according to the following protocols:

MDR 2000: ASTM D2084, D5289

Tensile Test for Rubber: D412

TABLE 1

|  | Sample No. | | | | | | | | |
| --- | --- | --- | --- | --- | --- | --- | --- | --- | --- |
|  | 1 | 2 | 3 | 4 | 5 | 6 | 7 | 8 | 9 |
| Natural Rubber | 70 | 70 | 70 | 70 | 70 | 70 | 70 | 70 | 70 |
| SBR[1] | 41.25 | 41.25 | 41.25 | 41.25 | 41.25 | 41.25 | 41.25 | 41.25 | 41.25 |
| Carbon Black | 35 | 17.5 | 0 | 35 | 17.5 | 0 | 35 | 17.5 | 0 |
| Resin[2] | 3 | 3 | 3 | 3 | 3 | 3 | 3 | 3 | 3 |
| Methylene Acc[3] | 1 | 1 | 1 | 1 | 1 | 1 | 1 | 1 | 1 |
| Antioxidant | 2 | 2 | 2 | 2 | 2 | 2 | 2 | 2 | 2 |
| Oil | 3.25 | 1.07 | 0 | 4.35 | 3.25 | 2.16 | 4.35 | 3.25 | 2.16 |
| ZnO | 3 | 3 | 3 | 3 | 3 | 3 | 3 | 3 | 3 |
| Stearic acid | 1 | 1 | 1 | 1 | 1 | 1 | 1 | 1 | 1 |
| Polyamide 25 μm[4] | 10 | 20 | 30 | 0 | 0 | 0 | 0 | 0 | 0 |
| Polyamide 1 μm[5] | 0 | 0 | 0 | 10 | 20 | 30 | 0 | 0 | 0 |
| Polyamide 0.3 μm[6] | 0 | 0 | 0 | 0 | 0 | 0 | 10 | 20 | 30 |
| Methylene Donor | 1 | 1 | 1 | 1 | 1 | 1 | 1 | 1 | 1 |
| Accelerator[7] | 0.22 | 0.22 | 0.22 | 0.22 | 0.22 | 0.22 | 0.22 | 0.22 | 0.22 |
| Sulfur | 2.81 | 2.81 | 2.81 | 2.81 | 2.81 | 2.81 | 2.81 | 2.81 | 2.81 |
| Sulfenamide | 1.47 | 1.47 | 1.47 | 1.47 | 1.47 | 1.47 | 1.47 | 1.47 | 1.47 |

[1]Extended with 37.5 phr of process oil
[2]Alkyl phenol formaldehyde resin as SP1068 from Schenectedy Chemical
[3]Methylene acceptor: reactive phenol formaldehyde resin as SMD 30207 from Schenectedy Chemical
[4]Polyamide 6,6; 20 percent by weight oil added as anticaking agent; amount expressed as polyamide only
[5]Polyamide 6,6; 10 percent by weight polyethyleneoxide added as anticaking agent; amount expressed as polyamide only
[6]Polyamide 6; 10 percent by weight polyethyleneoxide added as anticaking agent; amount expressed as polyamide only
[7]2,2'-dibenzothiazyl disulfide

TABLE 2

| Rubber Process Analyzer Test: @ 100° C., Frequency = 1 Hz, Strain Sweep (%) = 1/2/5/10 | | | | | | | | | |
| --- | --- | --- | --- | --- | --- | --- | --- | --- | --- |
| G' (1%), MPa | 0.79 | 0.59 | 0.43 | 0.93 | 0.78 | 0.66 | 0.93 | 0.77 | 0.66 |
| G' (2%), MPa | 0.78 | 0.59 | 0.43 | 0.92 | 0.76 | 0.65 | 0.91 | 0.76 | 0.66 |
| G' (5%), MPa | 0.75 | 0.59 | 0.43 | 0.87 | 0.74 | 0.64 | 0.86 | 0.74 | 0.65 |
| G' (10%), MPa | 0.71 | 0.57 | 0.42 | 0.81 | 0.7 | 0.6 | 0.81 | 0.7 | 0.62 |
| Tan δ (1%) | 0.047 | 0.032 | 0.044 | 0.043 | 0.032 | 0.031 | 0.046 | 0.035 | 0.029 |
| Tan δ (2%) | 0.055 | 0.039 | 0.04 | 0.049 | 0.041 | 0.033 | 0.049 | 0.04 | 0.032 |
| Tan δ (5%) | 0.059 | 0.046 | 0.048 | 0.056 | 0.046 | 0.047 | 0.057 | 0.047 | 0.044 |
| Tan δ (10%) | 0.069 | 0.05 | 0.052 | 0.066 | 0.063 | 0.068 | 0.065 | 0.058 | 0.056 |
| Monsanto Dynamic Rheometer 2000 Test @ 150° C. | | | | | | | | | |
| Delta Torque | 11.11 | 9.28 | 6.73 | 11.8 | 10.14 | 8.51 | 11.75 | 10.25 | 9.1 |
| Tand δ @ T90 | 0.027 | 0.03 | 0.048 | 0.029 | 0.081 | 0.055 | 0.021 | 0.029 | 0.042 |
| Cold Tensile D53504 Cure @ 150° C.; Test @ 23° C., Pulling Speed = 20 cm/min | | | | | | | | | |
| Elong at Break, % | 582 | 602 | 608 | 562 | 550 | 616 | 549 | 614 | 670 |
| 100% Mod, MPa | 1.62 | 1.18 | 0.75 | 1.85 | 1.44 | 1.03 | 1.87 | 1.34 | 0.97 |
| 200% Mod, MPa | 3.27 | 1.88 | 1.11 | 3.95 | 2.55 | 1.54 | 4.04 | 2.28 | 1.31 |
| 300% Mod, MPa | 6.01 | 3.15 | 1.46 | 6.80 | 4.20 | 2.26 | 7.15 | 3.97 | 1.97 |
| 500% Mod, MPa | 15.43 | 9.23 | 3.40 | 16.42 | 11.79 | 6.67 | 17.88 | 11.44 | 5.58 |
| Tensile Str, MPa | 20.9 | 15.4 | 6.8 | 20.6 | 15.1 | 14.6 | 21.2 | 19.4 | 16.0 |
| Hot Tensile D53504 Cure @ 150° C.; Test @ 100° C., Pulling Speed = 20 cm/min | | | | | | | | | |
| Elong at Break, % | 489 | 549 | 593 | 482 | 403 | 412 | 506 | 459 | 394 |
| 100% Mod, MPa | 1.48 | 1.08 | 0.72 | 1.65 | 1.18 | 0.80 | 1.58 | 1.06 | 0.69 |
| 200% Mod, MPa | 2.70 | 1.66 | 0.92 | 3.09 | 2.08 | 1.25 | 3.16 | 2.06 | 1.23 |
| 300% Mod, MPa | 4.08 | 2.47 | 1.24 | 4.61 | 3.17 | 1.88 | 4.83 | 3.28 | 1.93 |
| 500% Mod, MPa | 6.93 | 4.59 | 2.25 | — | — | — | 8.42 | — | — |
| Tensile Str, MPa | 7.0 | 5.3 | 3.0 | 7.4 | 4.5 | 2.9 | 8.5 | 5.4 | 2.8 |

As seen in Table 2, unexpectedly higher G' and modulus values are observed for the compositions of the present invention as compared with control, in particular for Sample 7.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire comprising at least one component, the at least one component comprising a rubber composition comprising:
    at least one diene-based rubber; and
    from 1 to 50 phr of a particulate polyamide having a particle size of from 0.1 to 1 micron, wherein the particulate polyamide is substantially spherical and wherein the particulate polyamide has a melting temperature greater than 210° C. as measured by ISO 11357;
    wherein the rubber composition further comprises an RFL adhesive disposed on the particulate polyamide.

2. The pneumatic tire of claim 1 wherein the particulate polyamide has a sphericity ranging from 0.9 to 1.

3. The pneumatic tire of claim 1 wherein the particulate polyamide has a sphericity ranging from 0.95 to 1.

4. The pneumatic tire of claim 1 wherein the particulate polyamide has a melting temperature greater than 240° C.

5. The pneumatic tire of claim 1 wherein the particulate polyamide has a melting temperature greater than 265° C.

6. The pneumatic tire of claim 1 wherein the particulate polyamide is present is an amount ranging from 10 to 30 phr.

7. The pneumatic tire of claim 1 wherein the rubber composition further comprises from 2.1 to 35 phr of the reaction product of
    (1) from 2 to 25 phr of a methylene acceptor; and
    (2) from 0.1 to 10 phr of a methylene donor selected from the group consisting of hexaethoxymethylmelamine, hexamethylenetetramine, hexamethoxymethylmelamine, imino-methoxymethylmelamine, imino-isobutoxymethylmelamine, lauryloxymethylpyridinium chloride, ethoxymethylpyridinium chloride, trioxan hexamethoxymethylmelamine and N-substituted oxymethyl melamines of the formula:

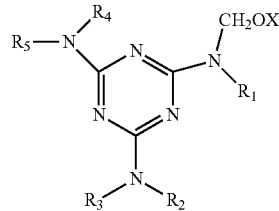

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

8. The pneumatic tire of claim 1 wherein said diene-based elastomer is selected from the group consisting of natural rubber, synthetic polyisoprene, polybutadiene and SBR.

9. The pneumatic tire of claim 4 wherein the methylene acceptor is selected from unmodified phenol novolak resins, modified phenol novolak resins, reactive phenol formaldehyde resins, and resorcinol novolak resins.

10. The pneumatic tire of claim 4 wherein the methylene acceptor is a reactive phenol formaldehyde resin.

11. The pneumatic tire of claim 4 wherein the methylene donor is hexamethylenetetramine.

12. The pneumatic tire of claim 1 wherein the rubber composition further comprises from 0.5 to 20 phr of sulfur containing organosilicon compounds are of the formula:

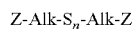

in which Z is selected from the group consisting of

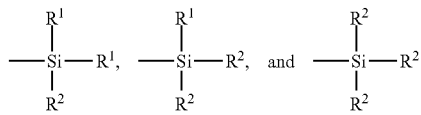

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

13. The pneumatic tire of claim 1 wherein the rubber composition comprises from 10 to 100 phr of carbon black.

14. The pneumatic tire of claim 1 wherein the rubber composition comprises from 10 to 100 phr of silica.

15. The pneumatic tire of claim 1 wherein the rubber composition comprises from 20 to 100 phr of a combination of carbon black and silica.

16. The pneumatic tire of claim 1 wherein the component is selected from the group consisting of tread, tread cap, tread base, sidewall, apex, chafer, sidewall insert, wirecoat or innerliner.

17. The pneumatic tire of claim 1 wherein the particle size of the particulate polyamide ranges from 0.2 to 0.50 microns.

* * * * *